(12) United States Patent
Towsley

(10) Patent No.: US 6,991,668 B2
(45) Date of Patent: Jan. 31, 2006

(54) DIESEL SOOT FILTER

(76) Inventor: Frank E. Towsley, 301 Richard Ct., Midland, MI (US) 48640

( * ) Notice: Subject to any disclaimer, the term of this patent is extended or adjusted under 35 U.S.C. 154(b) by 251 days.

(21) Appl. No.: 10/672,221

(22) Filed: Sep. 26, 2003

(65) Prior Publication Data

US 2005/0066640 A1    Mar. 31, 2005

(51) Int. Cl.
B01D 39/20    (2006.01)
B01D 46/00    (2006.01)

(52) U.S. Cl. ............ 55/525; 55/282.2; 55/282.3; 55/385.3; 55/497; 55/498; 55/503; 55/523; 55/DIG. 10; 55/DIG. 30; 60/311

(58) Field of Classification Search ............ 55/282.2, 55/282.3, 385.3, 495, 497, 498, 503, 523, 55/525, DIG. 5, DIG. 10, DIG. 30; 60/311; 264/43, 44, 603, 610, 628, DIG. 48
See application file for complete search history.

(56) References Cited

U.S. PATENT DOCUMENTS

| | | | |
|---|---|---|---|
| 3,536,480 A * | 10/1970 | Winkler | ............ 55/DIG. 5 |
| 4,053,371 A | 10/1977 | Towsley | |
| 4,121,992 A | 10/1978 | Towsley | |
| 4,477,417 A | 10/1984 | Domesle et al. | |
| 4,515,758 A | 5/1985 | Domesle et al. | |
| 4,588,707 A | 5/1986 | Domesle et al. | |
| 4,758,272 A * | 7/1988 | Pierotti et al. | ............ 55/523 |
| 4,759,918 A | 7/1988 | Homeier et al. | |
| 4,929,581 A | 5/1990 | Steinwandel et al. | |
| 4,965,101 A | 10/1990 | Frei et al. | |
| 5,067,319 A | 11/1991 | Moser | |
| 5,098,455 A | 3/1992 | Doty et al. | |
| 5,213,612 A * | 5/1993 | Minnear et al. | ............ 264/43 |
| 5,404,997 A | 4/1995 | Schreier et al. | |
| 5,458,664 A * | 10/1995 | Ishii et al. | ............ 55/523 |
| 5,505,757 A * | 4/1996 | Ishii | ............ 55/523 |

(Continued)

FOREIGN PATENT DOCUMENTS

EP    0 180 389 A    5/1986

(Continued)

OTHER PUBLICATIONS

Heck & Farrauto;Catalytic Air Pollution Control-Commercial Technology; 2nd Edition Chapter 8 &9; 2002; Wiley.

(Continued)

*Primary Examiner*—Jason M. Greene

(57) ABSTRACT

A filter for removing soot from the exhaust gases from a diesel engine. The filter incorporates two elements. The first element is a flow-through filter element incorporating a porous metal substrate formed by electrodepositing a metal such as nickel in the interstitial spaces of a packed array of electrically nonconductive particles of a material and then removing the material of the particles to produce the porous metal substrate. The second element is a hollow body having an inlet port and an outlet port, the filter element being positioned in and sealed to the hollow body so that diesel exhaust gases directed into the inlet port of the hollow body flow through the porous metal substrate from the inlet side of the porous metal substrate to the outlet side of the porous metal substrate and then out the outlet port of the hollow body. The bulk density of the porous metal substrate is less than 40% of the density of the metal of the substrate. The average pore diameter of the pores at the inlet side of the porous metal substrate is greater than one micrometer. The area of the pores of the inlet side of the porous metal substrate is greater than about 35% the area of the inlet side of the porous metal substrate.

11 Claims, 8 Drawing Sheets

U.S. PATENT DOCUMENTS

| | | | |
|---|---|---|---|
| 5,582,002 | A | 12/1996 | Pattas |
| 5,682,740 | A | 11/1997 | Kawamura |
| 5,709,722 | A | 1/1998 | Nagai et al. |
| 5,782,941 | A * | 7/1998 | Matsunuma et al. .......... 55/523 |
| 5,830,415 | A * | 11/1998 | Maeda et al. ................. 55/525 |
| 5,864,743 | A * | 1/1999 | Tuchinskiy et al. ......... 264/610 |
| 5,938,802 | A * | 8/1999 | Saito et al. ................ 55/282.3 |
| 5,961,931 | A * | 10/1999 | Ban et al. ..................... 55/525 |
| 6,203,649 | B1 | 3/2001 | Kremsmair et al. |
| 6,409,006 | B1 | 6/2002 | Takahashi et al. |
| 6,572,682 | B2 | 6/2003 | Peter et al. |
| 6,808,688 | B1 * | 10/2004 | Saito et al. ............ 55/DIG. 30 |
| 6,810,660 | B2 * | 11/2004 | Hepburn et al. .............. 55/523 |

FOREIGN PATENT DOCUMENTS

EP          0 878 636 A     11/1998

OTHER PUBLICATIONS

Ashby,Evans,Fleck,Gibson,Hutchinson & Wadley; Metal Foams: A Design Guide; Chapters 1 & 2 2000; SAE.

US Dept of Defense; Environmental Security Technology Certification Program;Cost and Performance Report CP-9906;Reduction of Diesel Engine.

Particulate Emissions Using A Self-Regenerating Soot Filter; May 2003.

* cited by examiner

DIESEL SOOT FILTER

BACKGROUND

The instant invention is in the field of particulate filters for trapping particulates such as ash and soot from diesel engine exhaust. More specifically, the instant invention relates to diesel exhaust filters comprising a porous metal filter media.

Diesel engines are fuel efficient and durable. However, diesel engine exhaust is a source of soot pollution. Soot pollution is a public health concern. It will be a significant advance in the diesel engine art when an effective, rugged and cost effective means is devised to significantly reduce diesel engine exhaust soot emissions.

Diesel exhaust soot filters are under development; see, for example, chapters 8 and 9 of the text book entitled Catalytic Air Pollution Control, Commercial Technology, $2^{nd}$ ed., 2002, ISBN 0-471-43624-0, by Heck and Farrauto, herein fully incorporated by reference. As discussed in Heck and Farrauto, most diesel soot filters use a porous ceramic filter element and can optionally incorporate a catalyst to lower the oxidation temperature of the soot, to control other pollutants such as carbon monoxide or unburned hydrocarbon vapor and even to absorb nitrogen oxides. Porous ceramic filter elements have a number of beneficial properties such as resistance to the high temperatures of diesel exhaust when the diesel engine operated at full power and the even higher temperatures that can occur during filter regeneration, i.e., when the trapped soot is ignited to burn off the soot and regenerate the filter (see, for example, FIG. 2 of U.S. Pat. No. 4,515,758).

The primary disadvantage of ceramic filter elements is their tendency to break in service. Diesel exhaust soot filters incorporating porous metal filter elements have been identified as being more promising than diesel exhaust soot filters incorporating ceramic filter elements because porous metal filter elements are less likely to break in service, see U.S. Pat. No. 5,709,722, herein fully incorporated by reference, and especially Column 2, lines 30–67.

The Environmental Security Technology Certification Program of the United States Department of Defense recently (May 2003) reported (Cost and Performance Report CP-9906) a comparison test of a commercially available diesel soot filter comprising a metal filter element (a mat of metal fibers) and a commercially available diesel soot filter comprising a porous ceramic filter element (porous cordierite).

The porous ceramic filter system demonstrated a 90% reduction in particulate emissions. The porous metal filter system (see U.S. Pat. No. 6,572,682, herein fully incorporated by reference) demonstrated a 62% reduction in particulate emissions. The porous ceramic filter system showed evidence of filter element breakage at the end of the testing. The porous metal filter system showed evidence of filter element gasket failure at the end of the testing. The cost of either system was about the same as the cost of the diesel engines used in the testing.

A number of open cell porous metal structures have been reported; see, for example chapters 1 and 2 of the text book by Ashby et al., Metal Foams, A Design Guide, 2000, ISBN 0-7680-0555-8. Ashby et al., page 5, state that such open cell porous metal structures "have potential for high-temperature gas and fluid filtration". In 1977 Frank E. Towsley was granted a patent on a unique open cell porous metal structure made, for example, by electrodepositing a metal in the interstitial spaces of a compacted bed of polystyrene particles followed by dissolution of the polystyrene, see U.S. Pat. No. 4,053,371, herein fully incorporated by reference. Towsley used such a porous cellular metal, for example, in an improved electrolytic cell; see U.S. Pat. No. 4,121,992, herein fully incorporated by reference, and Towsley suggested a number of other applications such as a filtration membrane, an electrode assembly for batteries, lightweight structural members, impact energy absorbers, and abrasive grinding combinations. However, Towsley did not teach the use of his porous cellular metal material in a diesel soot filter.

A diesel soot filter must not excessively increase the exhaust back pressure of the diesel engine. As discussed by Heck and Farrauto (see, for example, Section 3.2 of Chapter 9, of Heck and Farrauto) a diesel soot filter having an average pore size in the range of from about 10 to about 30 micrometers provides a filtration efficiency of from greater than 90% soot removal to about 60% soot removal for a filter element having a wall thickness of 0.017 inches. If the smaller pore size porous media is selected, then its filtration efficiency is higher but more filter area is needed to maintain a given exhaust back pressure through the filter. Conversely, if the larger pore size porous media is selected, then its filtration efficiency is lower but less filter area is needed to maintain a given exhaust back pressure through the filter. And, if the filter media has a greater porosity (more open pore area at the surface of the filter and more open volume in the filter wall) then back pressure is reduced while filtration efficiency is maintained (assuming the same pore size, the same wall thickness and the same filter area). However, the porosity of porous ceramic filter material is generally not greater than about 35% open pore area at the surface of the filter and about 50% open space in the filter wall (but see the apparently highly porous ceramic foam structure of U.S. Pat. No. 4,965,101) because porous ceramic filter material having a greater porosity tends to be too fragile for use in a diesel soot filter.

It would be an advance in the art of diesel soot filters if a diesel soot filter were developed that incorporated a durable break resistant porous metal filter element but which provided greater soot removal efficiency than existing diesel soot filters employing porous metal filter elements.

SUMMARY OF THE INVENTION

The instant invention provides a diesel soot filter incorporating a durable break resistant porous metal filter element and which provides excellent soot removal efficiency. The porous metal filter element of the instant invention has a high degree of porosity, a controlled pore size and a controlled pore area at the surface of the filter element. The metal filter element of the instant invention is formed by electrodepositing a metal (such as nickel or a nickel alloy) in the interstitial spaces of a packed array of substantially electrically nonconductive particles of a material (such as microspheres of polystyrene) and then substantially removing the material of the particles to produce the porous metal substrate. By compressing the packed array of substantially electrically nonconductive particles of a material before the metal is electrodeposited, the resulting porous metal substrate can be tailored to have a high degree of porosity and a controlled pore size at the filter element surface. The high degree of porosity and controlled pore size provides a relatively low back pressure filter with a high degree of soot removal. The porous metal filter element of the instant invention can be crimp sealed in a hollow sheet metal body to form a durable diesel soot filter device that has the outward appearance of an automobile muffler.

More specifically, the instant invention is a filter for removing soot from the exhaust gases from a diesel engine, comprising two elements. The first element is a flow-through filter element comprising a porous metal substrate formed by electrodepositing a metal in the interstitial spaces of a packed array of substantially electrically nonconductive particles of a material and then substantially removing the material of the particles to produce the porous metal substrate. The second element is a hollow body comprising an inlet port and an outlet port, the filter element being positioned in and sealed to the hollow body so that diesel exhaust gases directed into the inlet port of the hollow body flows through the porous metal substrate from the inlet side of the porous metal substrate to the outlet side of the porous metal substrate and then out the outlet port of the hollow body. The bulk density of the porous metal substrate is less than 40% of the density of the metal of the substrate. The average pore diameter of the pores at the inlet side of the porous metal substrate is greater than one micrometer. The area of the pores of the inlet side of the porous metal substrate is greater than about 35% the area of the inlet side of the porous metal substrate.

DETAILED DESCRIPTION OF THE INVENTION

Figure 1:
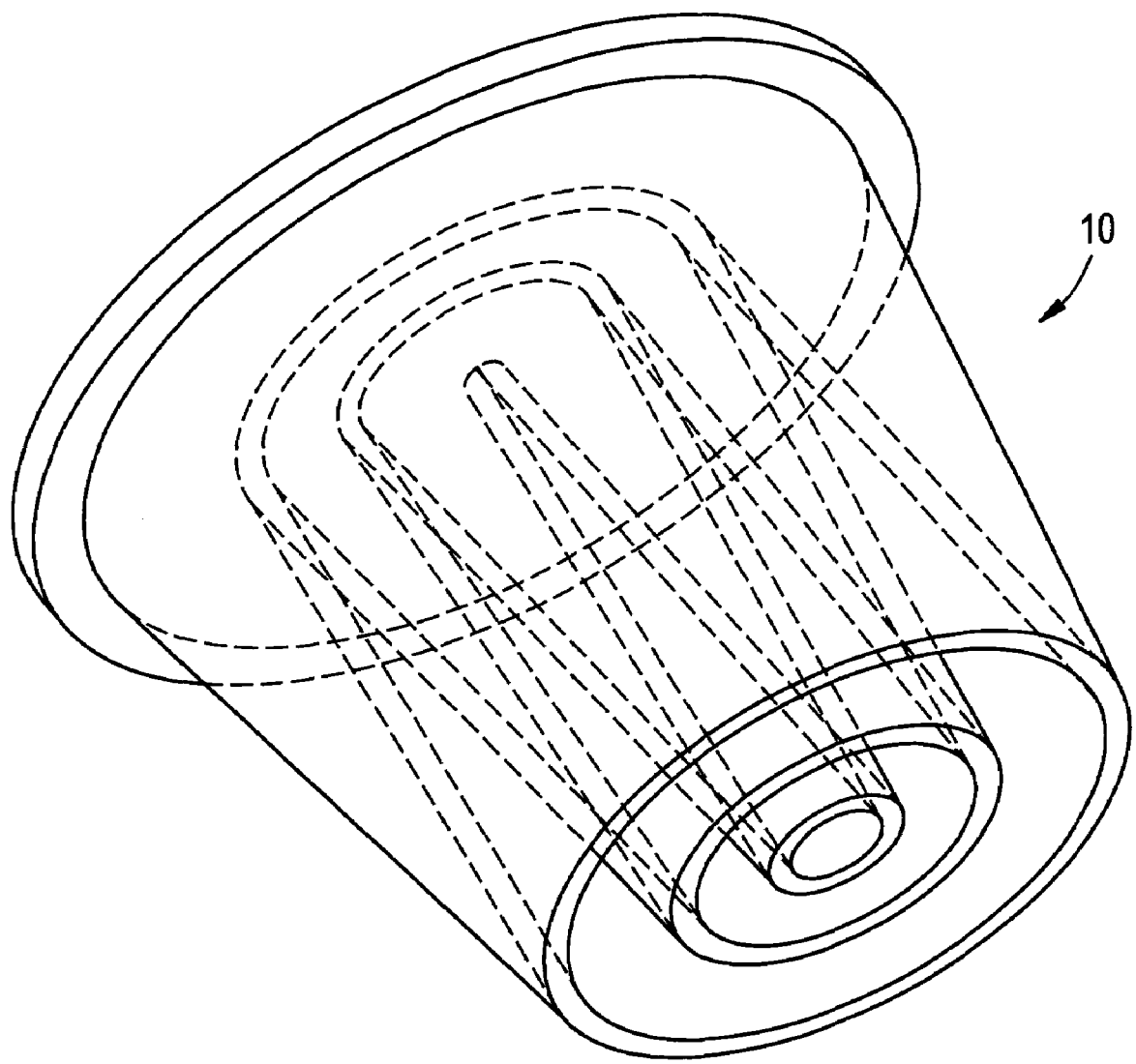
FIG. 1 is a perspective view of a preferred porous metal filter element of the instant invention.
Figure 2:
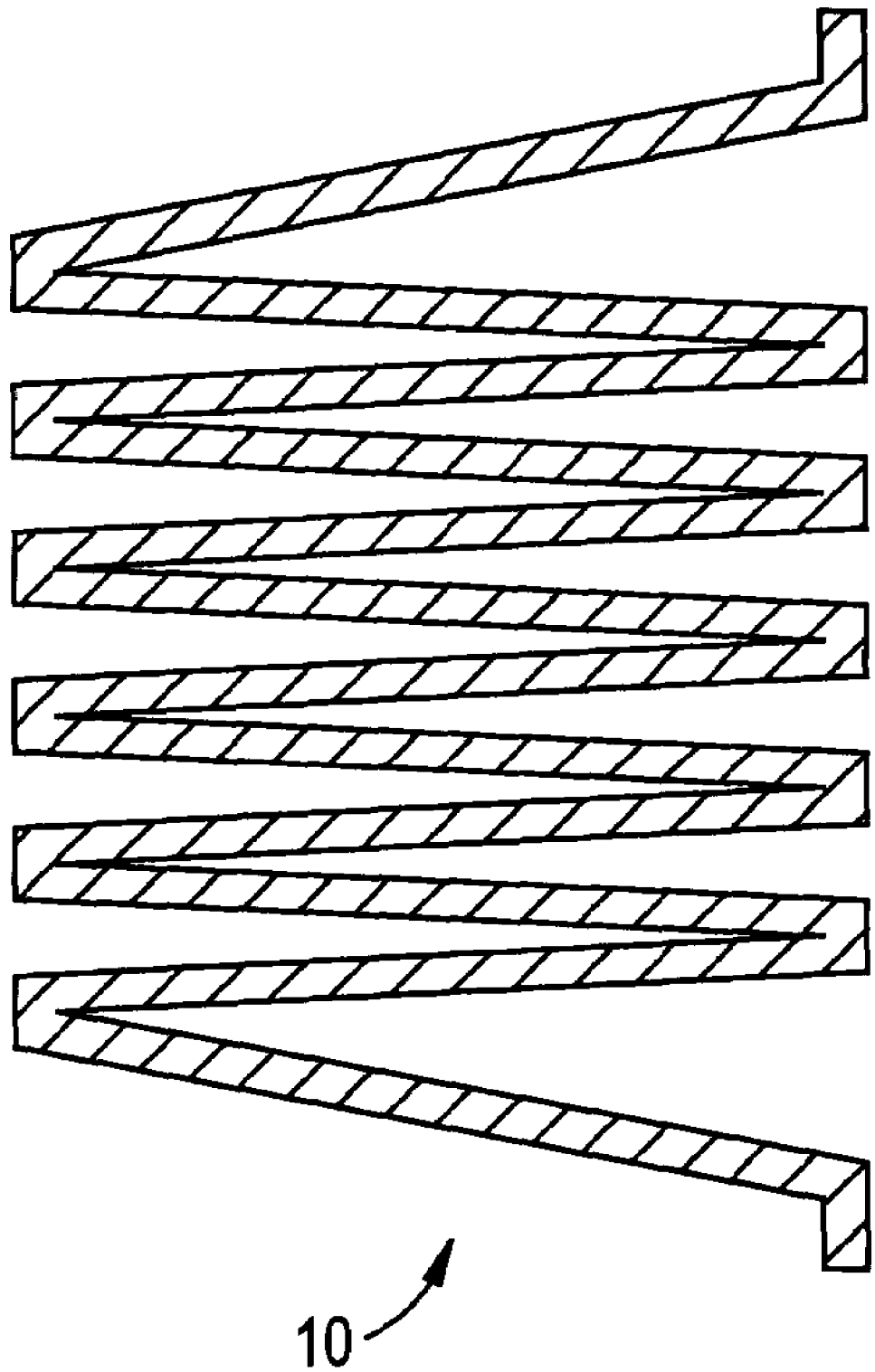
FIG. 2 is a side cross sectioned view of the filter element of FIG. 1.
Figure 3:
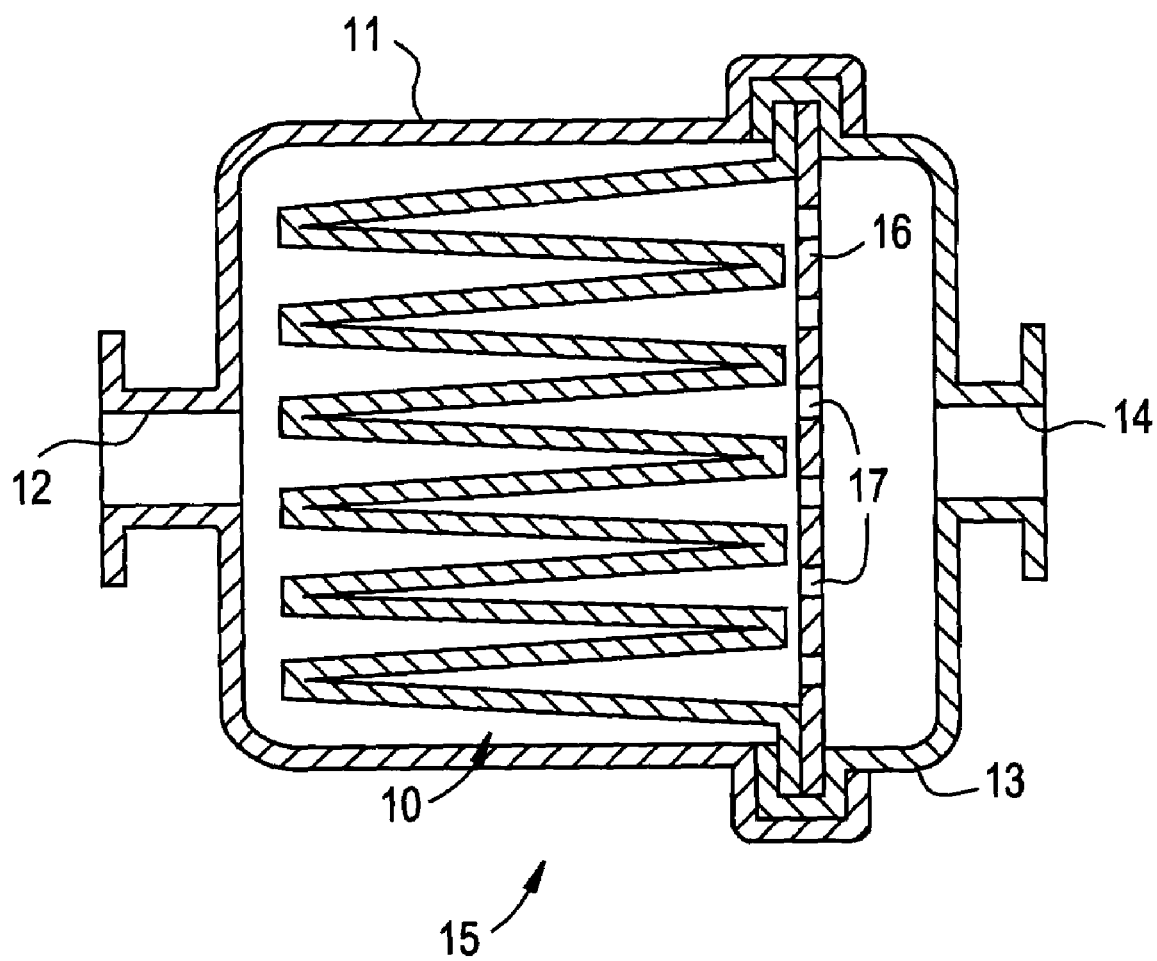
FIG. 3 is a side cross sectioned view of a preferred diesel soot filter of the instant invention showing the filter element of FIG. 1 crimp sealed in a hollow body having an inlet port and an outlet port.

Referring now to FIG. 1, therein is shown a perspective view of a preferred porous metal filter element 10 of the instant invention in the shape of a folded cone. Referring now to FIG. 2, therein is shown a side cross sectioned view of the filter element 10. Referring now to FIG. 3, therein is shown a side cross sectioned view of a preferred diesel soot filter 15 of the instant invention showing the filter element 10 crimp sealed in a hollow body comprised of an inlet bell shaped portion 11 having an inlet port 12 and an outlet bell shaped portion 13 having an outlet port 14. A filter element support disk 16 having holes therethrough 17 is used to mechanically support the filter element 10. The mouth of the inlet portion 11 and the mouth of the outlet portion 13 are crimp sealed to the peripheral edge of the filter element 10 and the peripheral edge of the disk 16 as shown in FIG. 3 so that the filter element is positioned in and sealed to the hollow body formed by the inlet portion 11 and the outlet portion 13 so that diesel exhaust gases directed into the inlet port 12 flow through the porous metal filter element 10 and out the outlet port 14.

Figure 4:
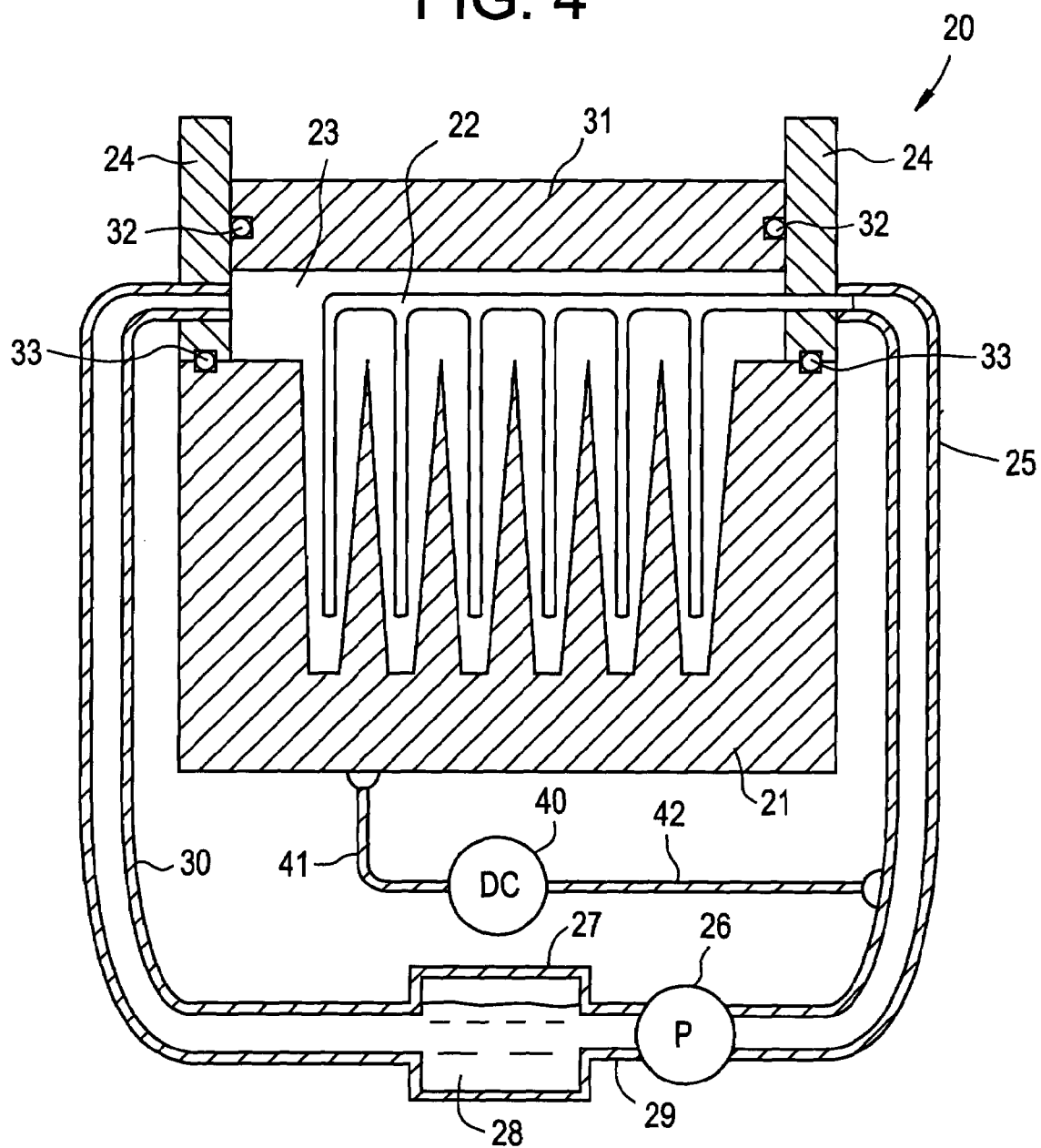
FIG. 4 is a side view of apparatus used to produce the porous metal filter element of FIG. 1.

Referring now to FIG. 4, therein is shown a side cross sectional view of apparatus 20 used to produce the porous metal filter element 10 of FIG. 1. A stainless steel tubing manifold 22 is positioned in a bed of fifteen micrometer diameter polystyrene microspheres 23 (available, for example, from Gerlinde Kisker, Steinfurt, Germany) contained in a graphite body 21 machined to have the same shape on its upper surfaces the outer shape of the porous filter element 10 of FIG. 1. A plastic collar 24 is positioned on and pressed against the graphite body 21. The manifold 22 extends through the collar 24 and is connected at one end to a stainless steel electroforming electrolyte delivery tube 25 that is connected at its other end to an electroforming electrolyte pump 26. A stainless steel electroforming electrolyte suction tube 29 is connected at one end thereof to a reservoir 27 containing electroforming electrolyte 28 and at the other end thereof to the pump 26. A stainless steel electroforming electrolyte return tube 30 extends at one end thereof through the collar 24 and is connected at the other end thereof to the reservoir 27. A piston 31 is used to compress the bed of polystyrene microspheres 23. A piston O-ring 32 is used to provide a sliding seal between the piston 31 and the collar 24. A collar O-ring 33 is used to locate the collar 24 in position on the body 21 and to provide a leak-tight seal between the collar 24 and the body 21.

Figure 5:
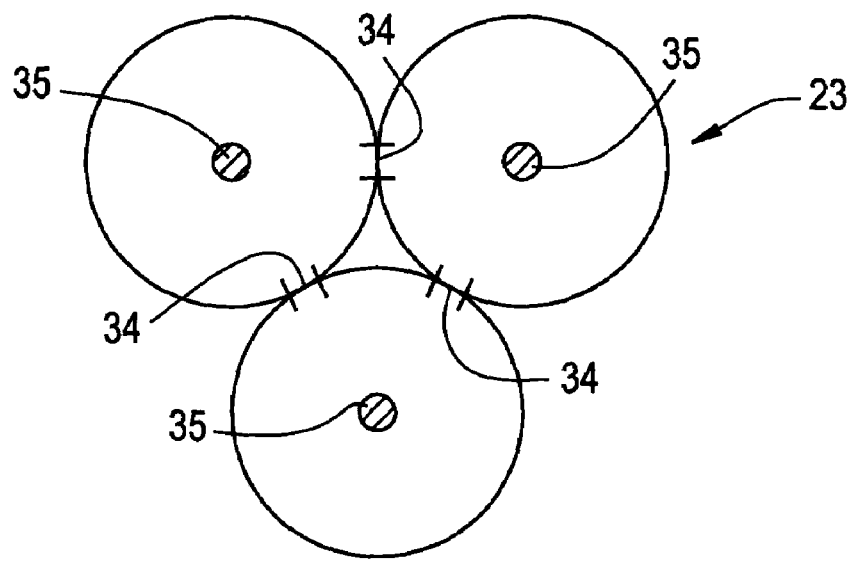
FIG. 5 is a side view of a portion of a packed bed of spherical polystyrene particles under little compression so that the diameter of the contact area between the particles is small relative to the diameter of the particles.

Referring now to FIG. 5, therein is shown a side view of a portion of the bed of polystyrene microspheres 23 of FIG. 4 under little compression from the piston 31 of FIG. 4 so that the diameter of the contact area 34 between the particles is small relative to the diameter of the particles. The contact area 34 between the particles is also shown as a contact area 35 for the microspheres 23 in contact with the graphite body 21 of FIG. 4.

Figure 6:
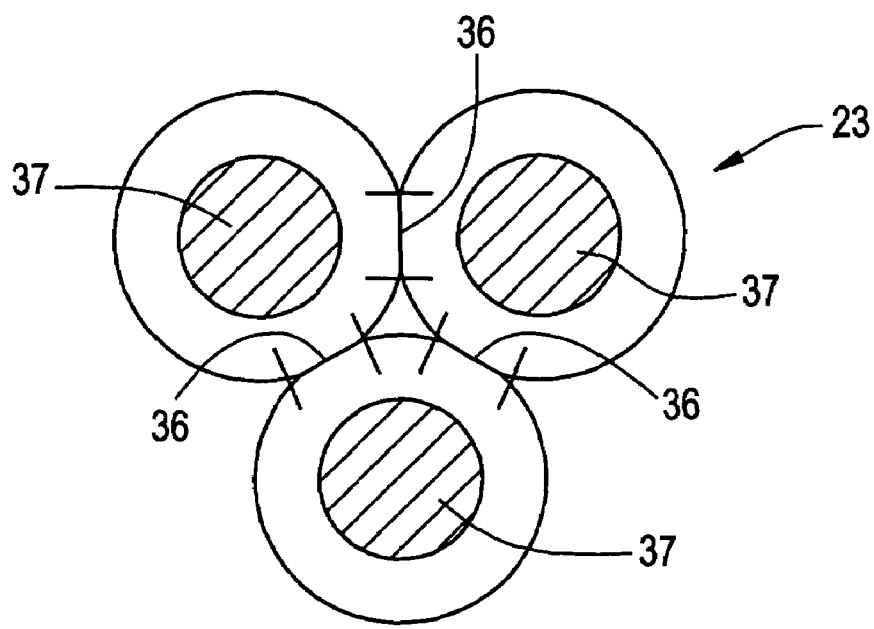
FIG. 6 is a side view of a portion of a packed bed of spherical polystyrene particles under greater compression than the particles of FIG. 5 so that the diameter of the contact area between the particles is larger relative to the diameter of the particles.

Referring now to FIG. 6, therein is shown a side view of a portion of the bed of polystyrene microspheres 23 of FIG. 4 under more compression from the piston 31 of FIG. 4 so that the diameter of the contact area 36 between the particles is about one half the diameter of the particles. The contact area 36 between the particles is also shown as a contact area 37 for the microspheres 23 in contact with the graphite body 21 of FIG. 4.

Figure 7:
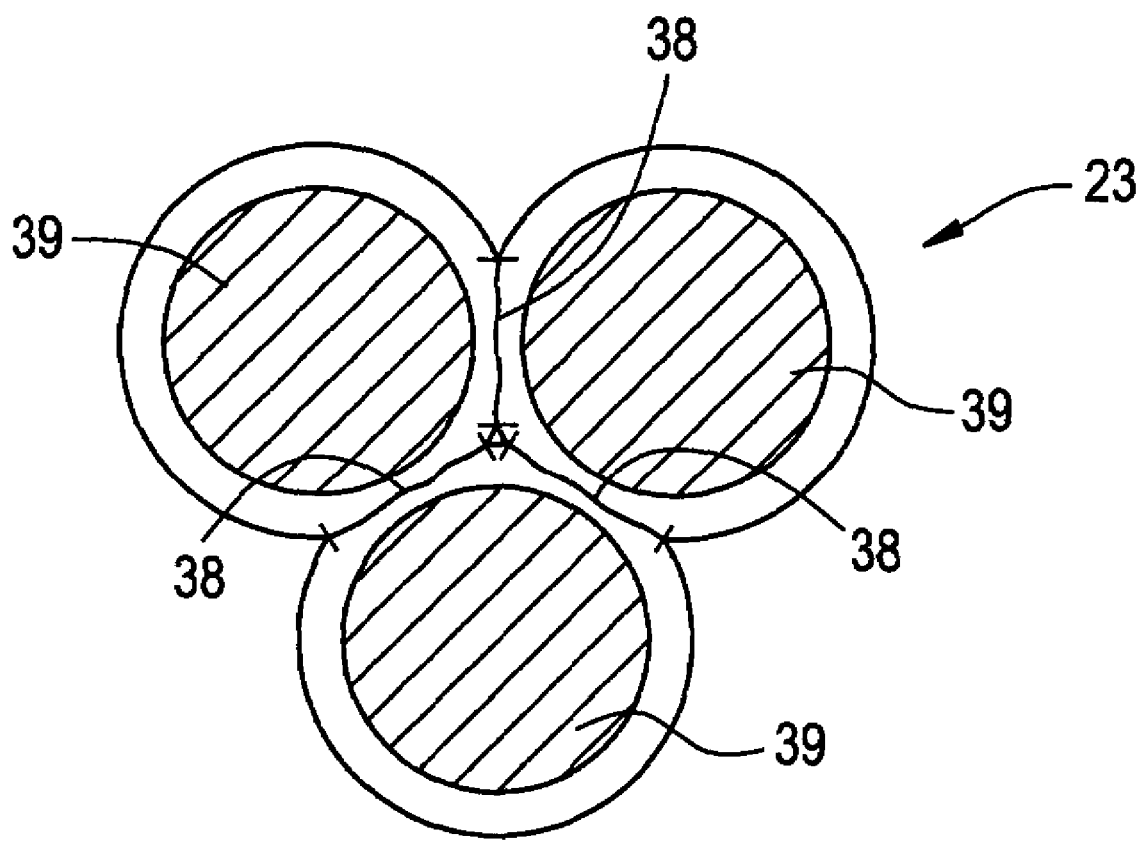
FIG. 7 is a side view of a portion of a packed bed of spherical polystyrene particles under greater compression than the particles of FIG. 6 so that the diameter of the contact area between the particles is even larger relative to the diameter of the particles.

Referring now to FIG. 7, therein is shown a side view of a portion of the bed of polystyrene microspheres 23 of FIG. 4 under a high degree of compression from the piston 31 of FIG. 4 so that the diameter of the contact area 38 between the particles is almost the same as the diameter of the particles. The contact area 38 between the particles is also shown as a contact area 39 for the microspheres 23 in contact with the graphite body 21 of FIG. 4.

Referring again to FIG. 4, the reservoir 27 is filled with a nickel electroforming solution 28 and the pump 26 is turned on so that the electroforming solution 28 is pumped through the tube 25, through the manifold 22, into the bed of microparticles 23, through the tube 30 and back to the reservoir 27. An electroforming power supply 40 is connected at one pole to the graphite body 21 by wire 41 and at the other pole to the tube 42. The power supply 40 is turned on to electrodeposit nickel in the interstitial spaces in the bed of microspheres 23 starting at the interface between the graphite body 21 and the bed of microspheres 23 and then to electrodeposit nickel into the bed of microspheres 23.

Referring still to FIG. 4, the power supply 40 and pump 26 are turned off after the nickel deposit is 0.030 inches thick. The collar 24, the piston 31 and the manifold 22 are removed from the bed of microparticles 23 and the graphite body 21. The electroformed nickel object formed on the graphite body 21 is then removed from the graphite body 21 and placed in a bath of toluene to dissolve the polystyrene microspheres and produce the porous metal filter element 10 of FIG. 1 (alternatively, the polystyrene microspheres can be removed by any desired means such as heating to melt and vaporize the polystyrene microspheres).

Figure 8:
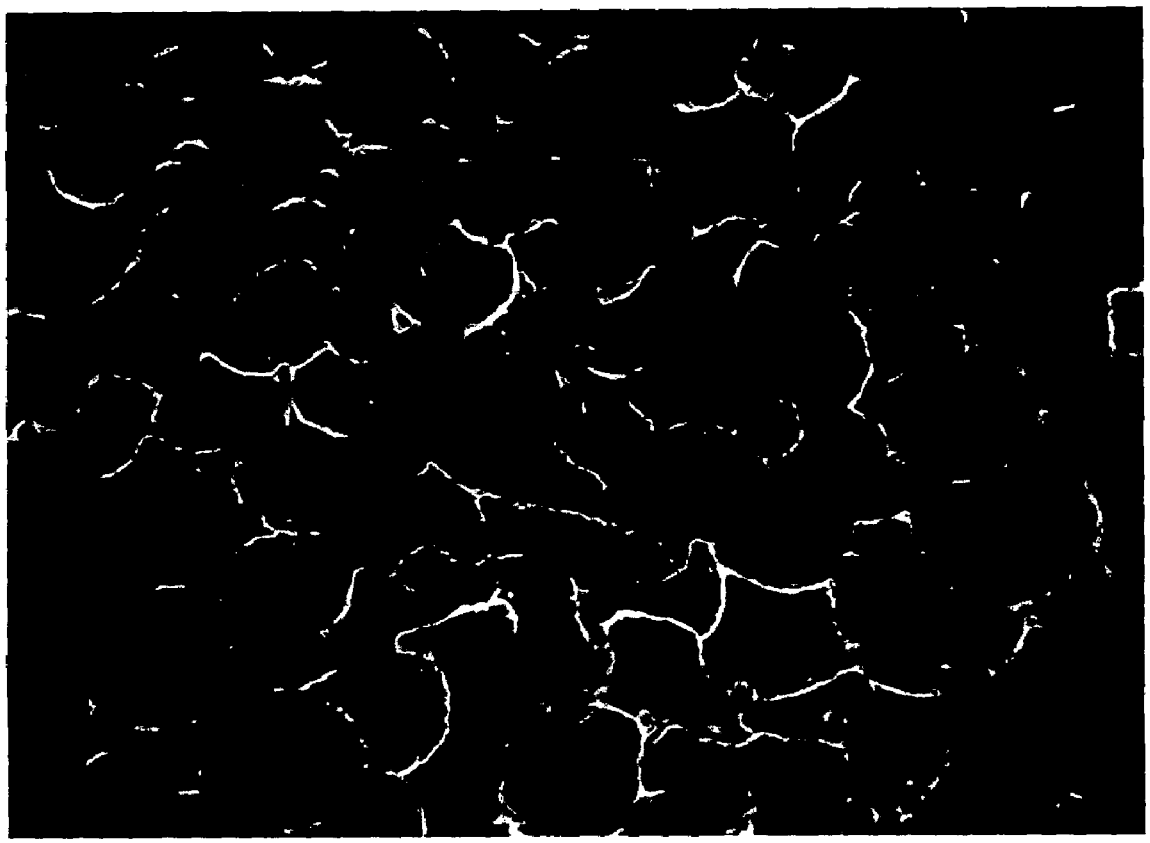
FIG. 8 is a microscopic view of the outlet side of the porous metal filter element of FIG. 1 showing its porous structure.

Referring now to FIG. 8, therein is shown a microscopic view of the outlet side of the porous metal filter element 10 showing its porous structure. The average diameter of the pores shown in FIG. 8 between the approximately 15 micrometer pockets left by the polystyrene microspheres is about 7 micrometers because the bed of microspheres 23 of FIG. 4 was compressed about as shown in FIG. 6. When the bed of microspheres 23 of FIG. 4 is compressed about as shown in FIG. 5 then the average diameter of such pores is about 3 or 4 micrometers. When the bed of microspheres 23 of FIG. 4 is compressed about as shown in FIG. 7, then the average diameter of such pores is about 12 micrometers. Thus, an important benefit of the instant invention is the ability to control the porosity characteristics of the porous metal filter element by controlling the size of particles used and their degree of compression.

The bulk density of the porous metal substrate of the instant invention should be less than 40% of the density of the metal of the substrate. The average pore size of the pores at the inlet side of the porous metal substrate should preferably be in the range of from one to thirty micrometers as determined by microscopic examination of a representative area of the substrate. The area of the pores of the inlet side of the porous metal substrate should be greater than about 35% the area of the inlet side of the porous metal substrate as determined by microscopic examination of a representative area of the substrate. More preferably, the average pore size of the pores of the inlet side of the porous metal substrate are in the range of from about five micrometers to about twenty micrometers since such a pore size range is effective to remove from more than ninety percent (by weight) of the soot from diesel exhaust gases (for a five micrometer average pore size) to about eighty percent (by weight) of soot from diesel exhaust gases (for a twenty micrometer average pore size). When a smaller pore size is selected to increase the degree of soot removal, then a larger filter element is required to control back pressure. The average pore diameter of the pores at any layer of the porous metal substrate should be larger than about one micrometer and preferably larger than about five micrometers.

The porous metal filter elements of the instant invention can be regenerated by any of the prior art techniques such as the burner regeneration and electrical regeneration techniques discussed, for example, in Chapter 9.4 of the Heck and Farrauto text book. Most preferably, the filter elements of the instant invention are used with the electrically initiated regeneration and control system described in U.S. Pat. No. 6,572,682. However, the filter element of the instant invention can be regenerated by any suitable means including the use of a catalyst on the filter element which catalyst reduces the regeneration temperature (such as the catalyst of U.S. Pat. No. 4,588,707) or even a catalyst that provides for continuous regeneration. Alternatively, the filter element of the instant invention can even be continuously heated by passing an electrical current through it so that it is continuously heated and regenerated. And, of course, the improved diesel soot filter of the instant invention can also be used in conjunction with a conventional nitrogen oxide absorber (for example the absorber of the '682 patent) and/or a catalyst for controlling pollutants in addition to soot (see, for example, Chapters 8 and 9 of the Heck and Farrauto text book).

The porous filter element 10 shown in FIG. 1 is highly preferred. However, it should be understood that other shapes can be used. For example, any of the shapes shown in the '722 or '682 patents can be used. The popular honeycomb shaped filter element like that shown in FIG. 9.5 and 9.6 of the above-referenced Heck and Farrauto text book can be formed by electroforming perforated disks using the apparatus shown in FIG. 9 and then stacking the disks together (with the holes in register) to form the device shown in FIG. 10.

Figure 9:
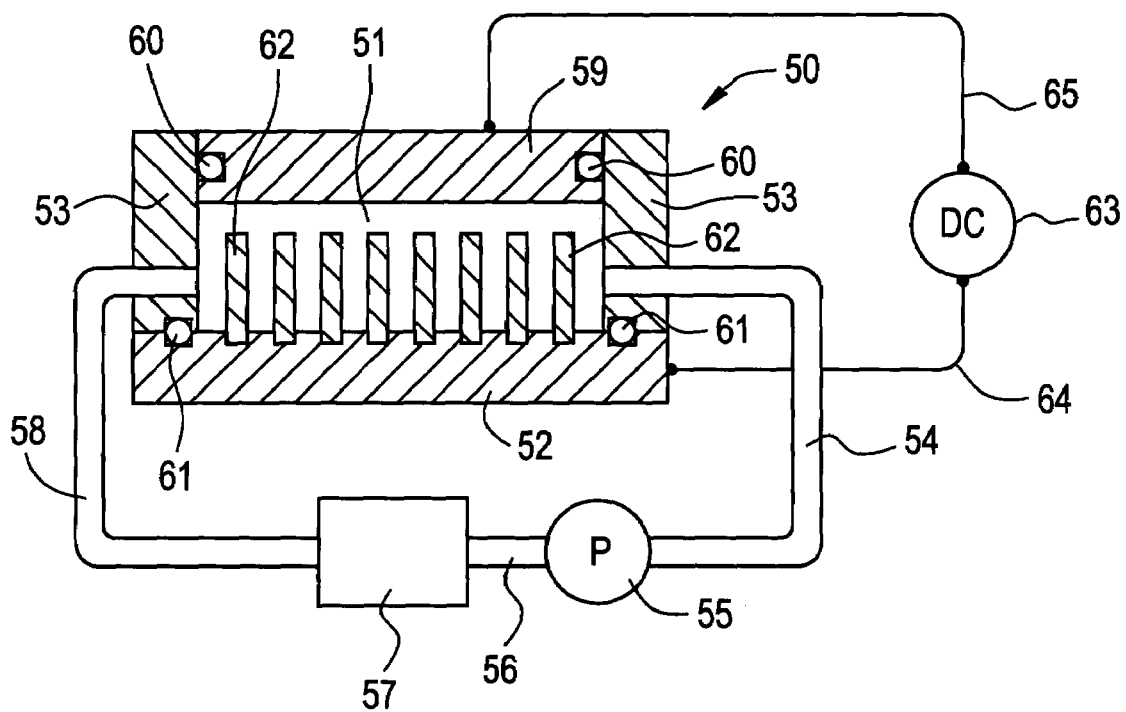
FIG. 9 is a side view of an apparatus used to produce porous metal disks.
Figure 10:
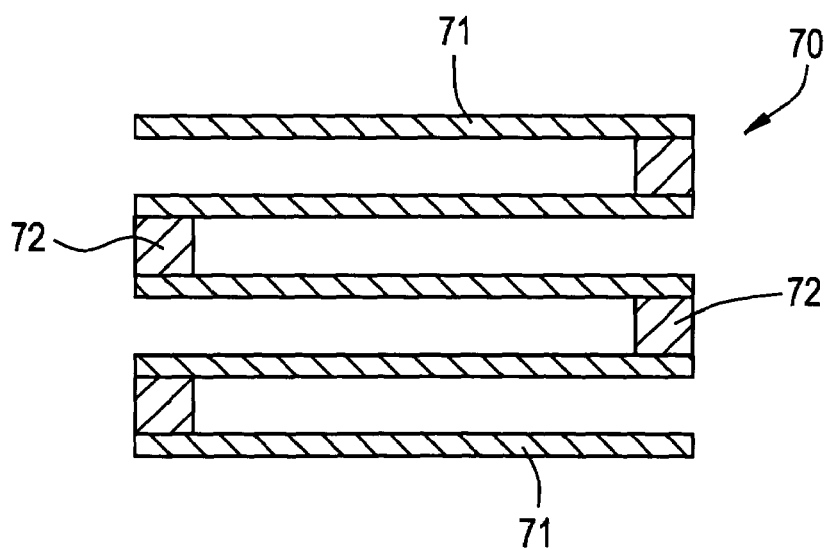
FIG. 10 is a side cross sectional view of a honeycomb shaped porous metal filter element made using the disks produced by the apparatus of FIG. 9.

Referring now to FIG. 9 therein is shown a side cross sectional view of apparatus 50 used to produce the disks to produce the porous metal filter element 70 of FIG. 10. A bed of fifteen micrometer diameter polystyrene microspheres 51 (available, for example, from Gerlinde Kisker, Steinfurt, Germany) contained on a graphite puck 52 and in a plastic collar 53. A stainless steel electroforming electrolyte delivery tube 54 extends at one end through the collar 53 and is connected at its other end to an electroforming electrolyte pump 55. A stainless steel electroforming electrolyte suction tube 56 is connected at one end thereof to a reservoir 57 containing electroforming electrolyte and at the other end thereof to the pump 55. A stainless steel electroforming electrolyte return tube 58 extends at one end thereof through the collar 53 and is connected at the other end thereof to the reservoir 57. A stainless steel piston 59 is used to compress the bed of polystyrene microspheres 51. A piston O-ring 60 is used to provide a sliding seal between the piston 59 and the collar 53. A collar O-ring 61 is used to locate the collar 53 in position on the puck 52 and to provide a leak-tight seal between the collar 53 and the puck 52. Plastic bar sections 62 extend from the puck 52 into the bed of microspheres 51.

Referring still to FIG. 9, the reservoir 57 is filled with a nickel electroforming solution and the pump 55 is turned on so that the electroforming solution is pumped through the tube 54, through the bed of microparticles 51, through the tube 58 and back to the reservoir 57. An electroforming power supply 63 is connected at one pole to the graphite puck 52 by wire 64 and at the other pole to the piston 59 by wire 65. The power supply 63 is turned on to electrodeposit nickel in the interstitial spaces in the bed of microspheres 51 starting at the interface between the graphite puck 52 and the bed of microspheres 51 and then to electrodeposit nickel into the bed of microspheres 23 around the rods 62. The power supply 63 and the pump 55 are turned off after the nickel deposit is 0.020 inches thick. The collar 53 and the piston 59 are removed from the bed of microparticles 51 and the graphite puck.

Referring still to FIG. 9, the electroformed nickel disk formed on the graphite puck is then removed from the graphite puck and placed in a bath of toluene to dissolve the polystyrene microspheres and produce a porous metal disk containing a regular geometric array of holes created by the plastic bars 62 (of course, the polystyrene microspheres can be removed by any suitable means such as heating to melt and vaporize the polystyrene microspheres). The process is repeated three hundred times to produce three hundred disks which are stacked together with their holes in register to produce the honeycomb shaped filter element 70 shown in FIG. 10 comprised of porous nickel wall portions 71 and plugs arranged in the conventional way so that exhaust gases must flow through the porous nickel wall portions 71 when the filter element 70 is sealed in a diesel exhaust filter device.

The composition of the electroforming solution used in the instant invention is important. Such solution is preferably a solution known to form a smooth continuous electrodeposited metal deposit as is well known in the electroforming or electroplating art as a solution having good "throwing power". As a general teaching, reference can be made to text books on the subject of electroplating and electroforming such as Blum, Principles of Electroplating and Electroforming or Newman & Newman, Electroplating and Electroforming: A Guide for the Craftsman, to the publication "ELECTROFIRMING" published by TechSolve Inc., Cincinnati Ohio, as well as to the ASTM publication B832-93 (2003) Standard Guide for Electroforming with Nickel and Copper. Further information related to nickel and nickel alloy electroforming is available from INCO Limited, Toronto, Canada.

Electroforming equipment and solutions are commercially available, for example, from Shor International Corporation, Mt. Vernon, N.Y. Electroformed Nickel, Inc. of Huntsville, Ala., offers, for example, electroforming equipment and personnel training on a turnkey basis. Further teachings regarding the formation of the cellular metal structure of the filter element of the instant invention can be found in U.S. Pat. No. 4,053,371. It should be understood that the term "metal" includes a pure metal (such as essentially pure nickel) as well as an alloy (such as an alloy of nickel and chromium). Most preferably, the metal is selected to be resistant to heat and corrosion. Nickel is a preferred metal since nickel has a melting point of almost one thousand five hundred degrees Celsius and nickel is resistant to corrosion. Alloys of nickel and chromium are more preferred in this regard and it is contemplated that an alloy such as Nichrome brand metal alloy (60% nickel, 24% iron and 16% chromium) should work well as the metal of the instant invention.

Most preferably, the bed of microspheres used to produce the porous metal filter element of the instant invention is made up of microspheres of essentially monodisperse diameter. Most preferably, the bed of microspheres used to produce the porous metal filter element of the instant invention is highly compressed as shown in FIG. 7 in order to the minimize back pressure of the filter element and maximize soot removal for a given microsphere diameter used. When using polystyrene microspheres, it is convenient to heat the bed of microspheres during compression (for example heating to 110 degrees Celsius) to soften the microspheres. Of course, the microspheres can be made of any convenient material that is electrically non-conductive, deformable under pressure and/or heat (or deformable by solvent swelling or otherwise) and substantially removable after the metal is electrodeposited in the interstitial spaces of the microspheres. Although microspheres are preferred to produce the porous metal filter element of the instant invention, it should be understood that any shape of substantially electrically nonconductive particle can be used, even a mat of substantially electrically nonconductive fibers. It should be understood that the substantially electrically nonconductive particles can have some small electrical conductivity and thus the term "substantially electrically nonconductive" means that the electrical current between the cathode and the anode of the electrodeposition cell is effective to electrolytically deposit the metal in the interstitial spaces. When the particles have a conductivity greater than substantially electrically nonconductive, then so much of the current between the cathode and the anode of the electrodeposition cell is carried through the particles that they either overheat or the electrodeposition rate of the metal is too slow for utility. The term "substantially removable" means that a sufficient amount of the material is removed so that the electrodeposited metal structure is porous as determined by microscopic examination of the structure.

The wall thickness of the porous metal filter element of the instant invention should be minimized to minimize back pressure while maintaining sufficient mechanical strength of the filter element. The use of the support plate 16 in the device of FIG. 3 helps to support the filter element 10 and thus permits a thinner wall thickness. The support plate 16 in the device of FIG. 3 is flat but a support structure having the same shape as the outlet surface of the filter element (such as a stamped perforated sheet of stainless steel or a stamped sheet of woven stainless steel wire) will permit a thinner wall thickness for the filter element of the instant invention and will be preferred in many applications.

A porous metal filter element having relatively large pores at its inlet surface graduating to relatively small pores at its outlet surface (to more effectively use the wall of the filter element as a depth filter and to increase the removal of relatively small particles with a minimum of increase in back pressure due to filter loading with soot) can be made by appropriately varying the diameter of the particles of electrically non-conductive material in layers from the inlet surface to the outlet surface of the filter or (perhaps more practically) by joining two or more filter elements of appropriate pore size or by following a larger pore size filter element with a smaller pore size filter element.

Alternatively, nonconductive particles of a relatively larger diameter can be compression molded to form a sintered structure and this structure can then be mated to a structure formed of compression molded nonconductive particles of a relatively smaller diameter (or less preferably a structure formed of compression molded nonconductive particles of the same diameter but with less compression) followed by electrodeposition of a metal in the interstitial spaces of the structures and then removal of the material of the nonconductive particles.

Polystyrene particles compression molded in a mold at about one hundred degrees Celsius for ten minutes followed by cooling to room temperature form excellent sintered structures that maintain the compressed shape of the polystyrene particles when the sintered structure is removed from the mold. Such a sintered structure compression molded in the graphite body 21 shown in FIG. 4 can be used to form a porous metal filter element of the instant invention. And, a second sintered structure comprising relatively smaller nonconductive particles (or less preferably a structure formed of compression molded nonconductive particles of the same diameter but with less compression) can be compression molded on top of the first structure so that the porous metal filter element of the instant invention has relatively larger pores at its inlet side in the region represented by the first sintered structure and then relatively smaller pores in the region represented by the second sintered structure.

Sintered structures can also be formed by filling a mold with plastic particles followed by introduction of a solvent into the plastic particles. The solvent is selected to be a solvent that swells the plastic particles. The degree of swelling of the plastic particles determines the degree of compression of the plastic particles in the sintered structure. The excess solvent is then removed from the interstitial spaces of the sintered structure followed by electrodeposition of a metal in at least a portion of the interstitial spaces of the sintered structure.

It should be understood that the term "pore size" used herein and in the claims with regard to the filter element of the instant invention, means the average diameter (as determined by microscopic examination of a representative area of the filter element) of the holes or passageways into the filter element at the surface of the filter element or the average diameter of the holes between the pockets of the filter element (the pockets formed by the removal of the nonconductive particles after the metal has been electrodeposited).

In conclusion, it is readily apparent that although the invention has been described in relation with its preferred embodiments, it should be understood that the instant invention is not limited thereby but is intended to cover all alternatives, modifications and equivalents that are included within the scope of the invention as defined by the following claims.

What is claimed is:

1. A filter for removing soot from the exhaust gases from a diesel engine, comprising: (a) a flow-through filter element comprising a porous metal substrate formed by electrodepositing a metal in the interstitial spaces of a packed array of substantially electrically nonconductive particles of a material and then substantially removing the material of the particles to produce the porous metal substrate; (b) a hollow body comprising an inlet port and an outlet port, the filter element being positioned in and sealed to the hollow body so that diesel exhaust gases directed into the inlet port of the hollow body flow through the porous metal substrate from the inlet side of the porous metal substrate to the outlet side of the porous metal substrate and then out the outlet port of the hollow body, the bulk density of the porous metal substrate being less than 40% of the density of the metal of the substrate, the average pore diameter of the pores at the inlet side of the porous metal substrate being in the range of from one to thirty micrometers, the area of the pores of the inlet side of the porous metal substrate being greater than about 35% the area of the inlet side of the porous metal substrate.

2. The filter of claim 1, wherein the average pore diameter of the pores at the inlet side of the porous metal substrate is in the range of from five to twenty micrometers.

3. The filter of claim 1, wherein the bulk density of the porous metal substrate is less than 25% of the density of the metal of the substrate.

4. The filter of claim 2, wherein the bulk density of the porous metal substrate is less than 25% of the density of the metal of the substrate.

5. The filter of claim 1, wherein the metal is nickel or an alloy comprising nickel.

6. The filter of claim 2, wherein the metal is nickel or an alloy comprising nickel.

7. The filter of claim 3, wherein the metal is nickel or an alloy comprising nickel.

8. The filter of claim 4, wherein the metal is nickel or an alloy comprising nickel.

9. The filter of claim 1, wherein the average pore diameter of the pores at the outlet side of the porous metal substrate is less than thirty micrometers.

10. The filter of claim 4, wherein the average pore diameter of the pores at the outlet side of the porous metal substrate is less than ten micrometers.

11. The filter of claim 8, wherein the average pore diameter of the pores at the outlet side of the porous metal substrate is less than ten micrometers.

* * * * *